United States Patent [19]
Cericola

[11] Patent Number: 5,894,675
[45] Date of Patent: Apr. 20, 1999

[54] COMBINATION TOOL

[76] Inventor: Joseph Cericola, 70903 2nd Ave., South Haven, Mich. 49090

[21] Appl. No.: 08/799,375

[22] Filed: Feb. 14, 1997

[51] Int. Cl.$^6$ .............................. B43L 7/027; G01B 3/10
[52] U.S. Cl. .................. 33/451; 33/760; 33/DIG. 21; 33/286
[58] Field of Search ................... 33/391, 275 R, 33/286, 451, 760, DIG. 21

[56] References Cited

U.S. PATENT DOCUMENTS

| 4,700,489 | 10/1987 | Vasile | 33/760 |
| 5,075,977 | 12/1991 | Rando | 33/DIG. 21 |
| 5,077,910 | 1/1992 | Smith | 33/760 |
| 5,481,810 | 1/1996 | Hastings et al. | 33/760 |
| 5,561,911 | 10/1996 | Martin | 33/DIG. 21 |

Primary Examiner—Christopher W. Fulton

[57] ABSTRACT

A new Combination Tool for use in measuring, leveling, squaring, and plumbing operations. The inventive device includes a housing adapted to encase a tape measure including an extendable and retractable tape and adapted to encase a laser source capable of projecting a visible light beam, wherein the extendable and retractable tape is extendable from the housing and the visible light beam is projectable from the housing perpendicular to the extendable and retractable tape. A horizontal bubble-leveling vial and a vertical bubble-leveling vial are mounted on the housing for leveling thereof in horizontal and vertical planes.

7 Claims, 6 Drawing Sheets

COMBINATION TOOL

BACKGROUND OF THE INVENTION

1. Field of the Invention

The present invention relates to combination hand tools and more particularly pertains to a new Combination Tool for use in measuring, leveling, squaring, and plumbing operations.

2. Description of the Prior Art

The use of combination hand tools is known in the prior art. More specifically, combination hand tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art combination hand tools include U.S. Pat. No. 5,075,977; U.S. Pat. No. 4,852,265; U.S. Pat. No. D299,437; U.S. Pat. No. 3,897,637; U.S. Pat. No. 5,446,968; and U.S. Pat. No. 5,012,585.

While these devices fulfill their respective, particular objectives and requirements, the aforementioned patents do not disclose a new Combination Tool. The inventive device includes a housing adapted to encase a tape measure including an extendable and retractable tape and adapted to encase a laser source capable of projecting a visible light beam, wherein the extendable and retractable tape is extendable from the housing and the visible light beam is projectable from the housing perpendicular to the extendable and retractable tape. A horizontal bubble-leveling vial and a vertical bubble-leveling vial are mounted on the housing for leveling thereof in horizontal and vertical planes.

In these respects, the Combination Tool according to the present invention substantially departs from the conventional concepts and designs of the prior art, and in so doing provides an apparatus primarily developed for the purpose of use in measuring, leveling, squaring, and plumbing operations.

SUMMARY OF THE INVENTION

In view of the foregoing disadvantages inherent in the known types of combination hand tools now present in the prior art, the present invention provides a new Combination Tool construction wherein the same can be utilized for use in measuring, leveling, squaring and plumbing operations.

The general purpose of the present invention, which will be described subsequently in greater detail, is to provide a new Combination Tool apparatus and method which has many of the advantages of the combination hand tools mentioned heretofore and many novel features that result in a new Combination Tool which is not anticipated, rendered obvious, suggested, or even implied by any of the prior art combination hand tools, either alone or in any combination thereof.

To attain this, the present invention generally comprises a housing adapted to encase a tape measure including an extendable and retractable tape and adapted to encase a laser source capable of projecting a visible light beam, wherein the extendable and retractable tape is extendable from the housing and the visible light beam is projectable from the housing perpendicular to the extendable and retractable tape. A horizontal bubble-leveling vial and a vertical bubble-leveling vial are mounted on the housing for leveling thereof in horizontal and vertical planes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Combination Tool apparatus and method which has many of the advantages of the combination hand tools mentioned heretofore and many novel features that result in a new Combination Tool which is not anticipated, rendered obvious, suggested, or even implied by any of the prior art combination hand tools, either alone or in any combination thereof.

It is another object of the present invention to provide a new Combination Tool which may be easily and efficiently manufactured and marketed.

It is a further object of the present invention to provide a new Combination Tool which is of a durable and reliable construction.

An even further object of the present invention is to provide a new Combination Tool which is susceptible of a low cost of manufacture with regard to both materials and labor, and which accordingly is then susceptible of low prices of sale to the consuming public, thereby making such Combination Tool economically available to the buying public.

Still yet another object of the present invention is to provide a new Combination Tool which provides in the apparatuses and methods of the prior art some of the advantages thereof, while simultaneously overcoming some of the disadvantages normally associated therewith.

Still another object of the present invention is to provide a new Combination Tool for use in measuring, leveling, squaring, and plumbing operations.

Yet another object of the present invention is to provide a new Combination Tool which includes a housing adapted to encase a tape measure including an extendable and retractable tape and adapted to encase a laser source capable of projecting a visible light beam, wherein the extendable and retractable tape is extendable from the housing and the visible light beam is projectable from the housing perpendicular to the extendable and retractable tape. A horizontal bubble-leveling vial and a vertical bubble-leveling vial are mounted on the housing for leveling thereof in horizontal and vertical planes.

Still yet another object of the present invention is to provide a new Combination Tool that can be used in squaring corners, measuring distances, leveling surfaces or objects in horizontal and vertical planes, plumbing and leveling over long distances, and transferring points from one surface to another.

Even still another object of the present invention is to provide a new Combination Tool that is more accurate than string bobs, string levels, and other conventional tools currently used for measuring, leveling, squaring, and plumbing operations.

Even still another object of the present invention is to provide a new Combination Tool that is more convenient than conventional tools by combining multiple functions into one tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new Combination Tool embodying the principles and concepts of the present invention and generally designated by the reference numeral 10 will be described.

More specifically, it will be noted that the Combination Tool 10 comprises a housing 12 adapted to encase a tape measure 2 including an extendable and retractable tape 3 and adapted to encase a laser source 5 capable of projecting a visible light beam 6, wherein the extendable and retractable tape 3 is extendable from the housing 12 and the visible light beam 6 is projectable from the housing 12 perpendicular to the extendable and retractable tape 3. A horizontal bubble-leveling vial 41 and a vertical bubble-leveling vial 42 are mounted on the housing 12 for leveling thereof in horizontal and vertical planes.

The Combination Tool 10 is intended for use with a tape measure 2 including an extendable and retractable tape 3 and a locking button 4 for locking and releasing the extendable and retractable tape 3. The housing 12 may be modified to encase a 12 foot, a 16 foot, a 25 foot, or other length tape measure 2. The Combination Tool 10 is also intended for use with a laser source 5 capable of projecting a visible light beam 6. The laser source 5 includes a power switch 7. The laser source 5 comprises a common laser pointer such as a Quarton, Inc. "Infiniter" (model number NF108).

As best illustrated in FIGS. 1 through 7, it can be shown that the housing 12 is generally triangular-shaped and has a first corner 12a, a second corner 12b, and a third corner 12c. The housing 12 has a first side 13a joining the first corner 12a and the third corner 12c and has a second side 13b joining the second corner 12b and the third corner 12c wherein the first side 13a and the second side 13b are substantially perpendicular to each other.

Figure 7:
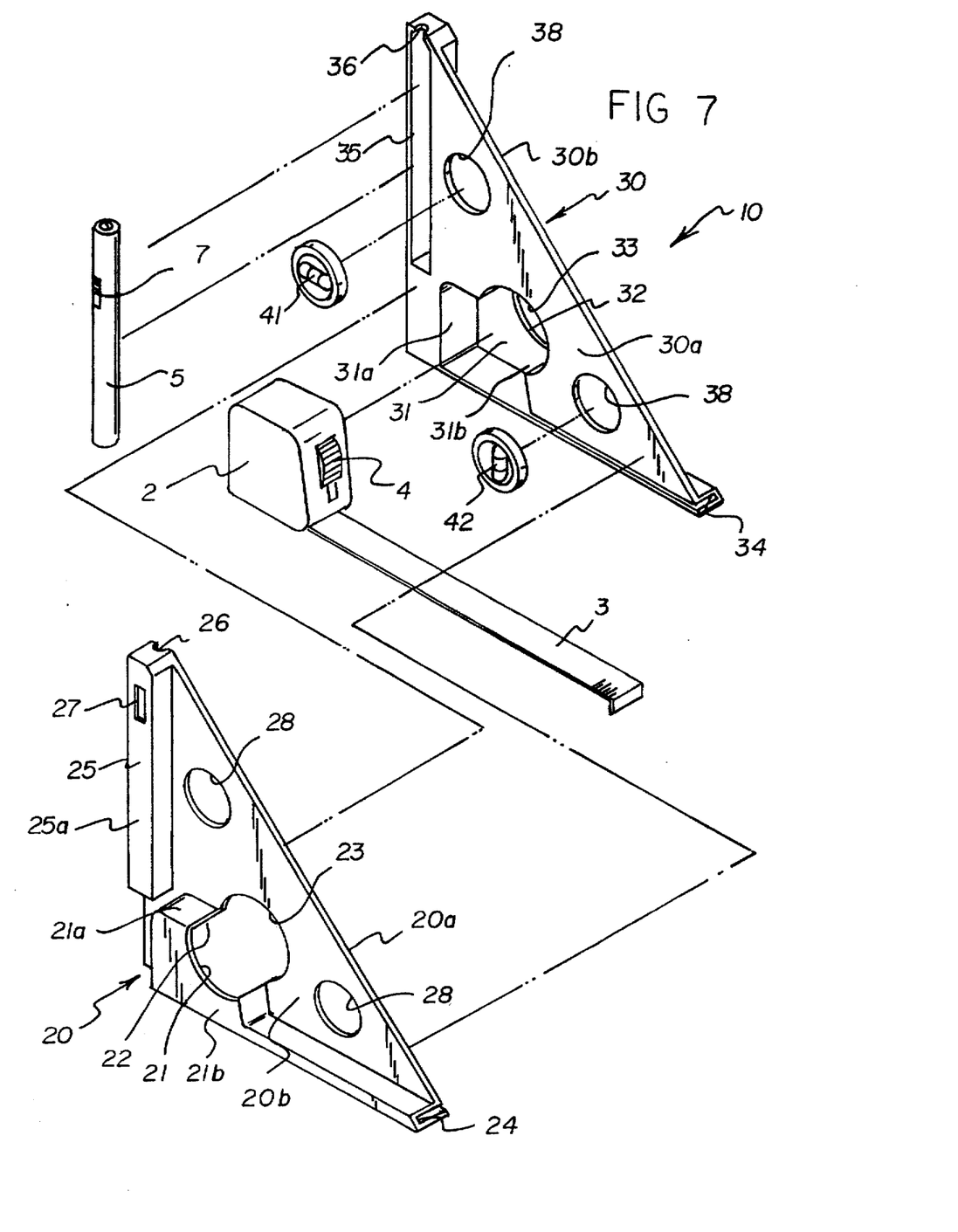
FIG. 7 is an exploded illustration of the present invention.

As best illustrated in FIG. 7, it can be shown that the housing 12 comprises a first-half member 20 and a second-half member 30. The first-half member 20 and the second-half member 30 each have an inner surface 20a and 30a, respectively, and an outer surface 20b and 30b, respectively.

The first-half member 20 includes a first-half tape measure niche 21 adjacent the first side 13a of the housing 12. The first-half tape measure niche 21 is open to the inner surface 20a of the first-half member 20 and projects from the outer surface 20b of the first-half member 20 so as to form a first-half perimeter wall 21a and a first-half side wall 21b. The second-half member 30 includes a second-half tape measure niche 31 adjacent the first side 13a of the housing 12. The second-half tape measure niche 31 is open to the inner surface 30a of the second-half member 30 and projects from the outer surface 30b of the second-half member 30 so as to form a second-half perimeter wall 31a and a second-half side wall 31b. The first-half tape measure niche 21 is aligned with the second-half tape measure niche 31.

Figure 1:
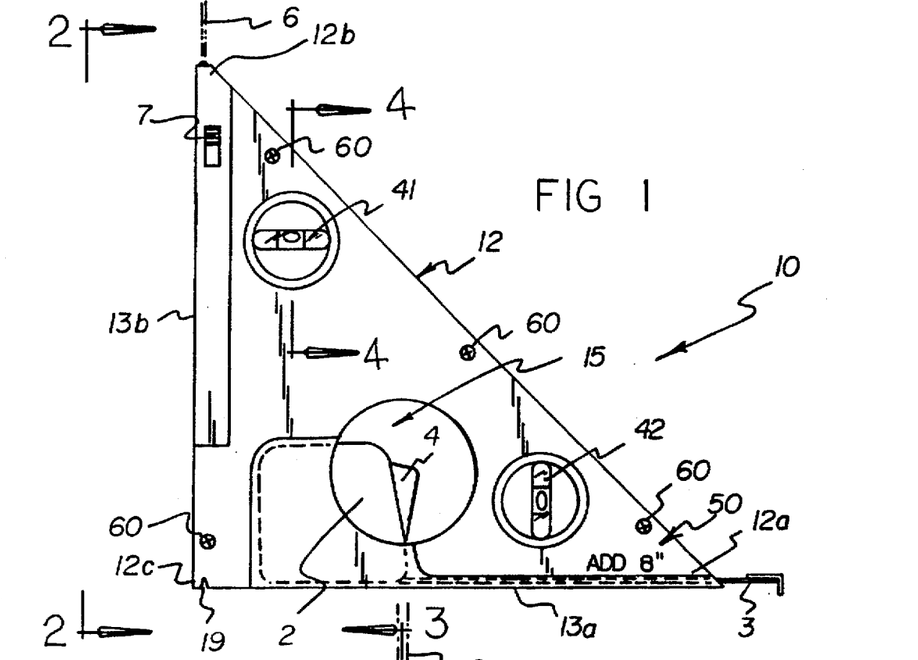
FIG. 1 is an illustration of a new Combination Tool according to the present invention.
Figure 2:
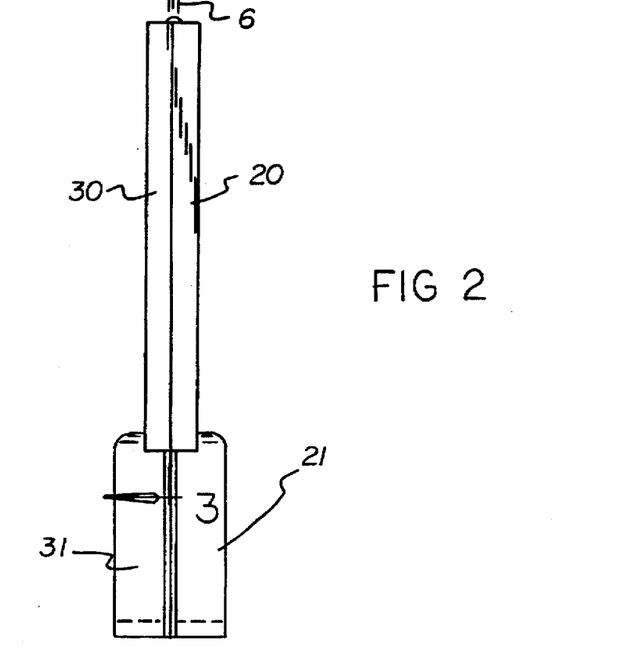
FIG. 2 is an illustration of the present invention from the perspective of line 2—2 of FIG. 1.
Figures 3, 4:
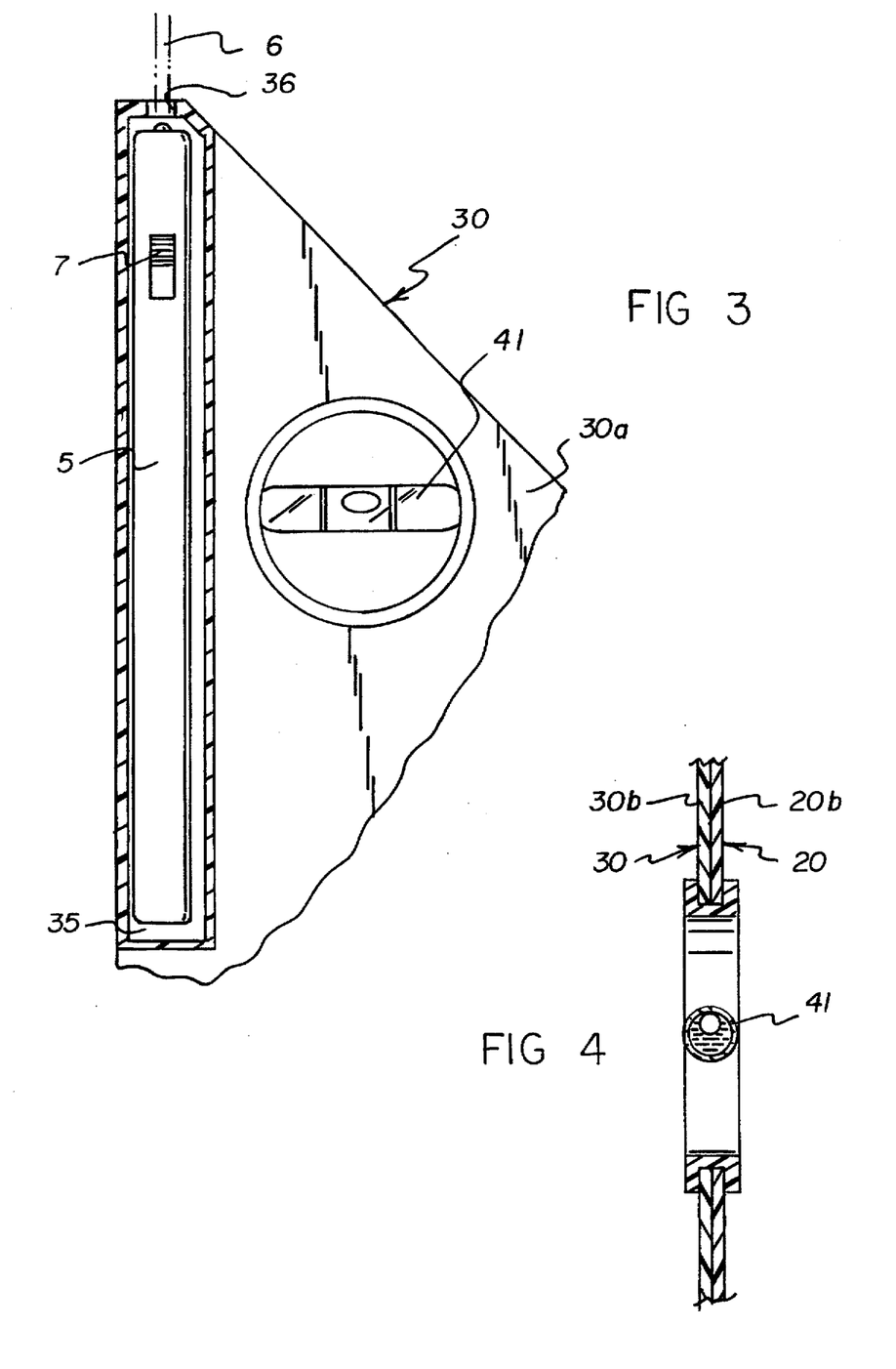
FIG. 3 is a sectional view taken along line 3—3 of FIG. 2.
FIG. 4 is a cross sectional view taken along line 4—4 of FIG. 1.

As best illustrated in FIGS. 1 and 7, it can be shown that the first-half tape measure niche 21 has a first-half niche opening 22 therein. The first-half niche opening 22 is provided in the first-half perimeter wall 21a and the first-half side wall 21b. The second-half tape measure niche 31 has a second-half niche opening 32 therein. The second-half niche opening 32 is provided in the second-half perimeter wall 31a and the second-half side wall 31b. The first-half member 20 has a first-half hole 23 therethrough contiguous with the first-half tape measure niche 21 and the first-half niche opening 22. The second-half member 30 has a second-half hole 33 therethrough contiguous with the second-half tape measure niche 31 and the second-half niche opening 32.

Figure 5:
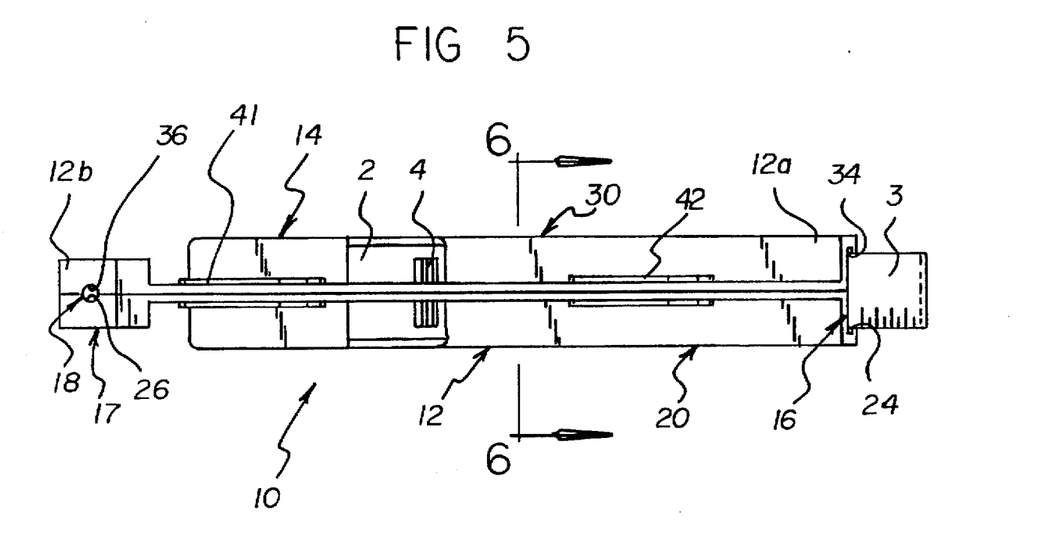
FIG. 5 is a top view of the present invention.
Figure 6:
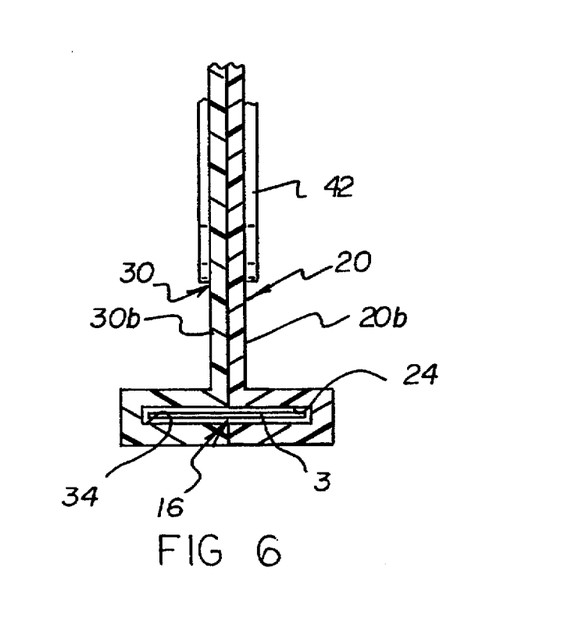
FIG. 6 is a cross sectional view taken along line 6—6 of FIG. 5.

As best illustrated in FIGS. 5 through 7, it can be shown that the first-half member 20 includes a first-half tape groove 24 adjacent and parallel to the first side 13a of the housing 12. The first-half tape groove 24 is open to the inner surface 20a of the first-half member 20 and is open at one end to the first-half tape measure niche 21 and open at an opposite end to the first corner 12a of the housing 12 whereby the first-half tape groove 24 provides communication between the first-half tape measure niche 21 and the first corner 12a. The second-half member 30 includes a second-half tape groove 34 adjacent and parallel to the first side 13a of the housing 12. The second-half tape groove 34 is open to the inner surface 30a of the second-half member 30 and is open at one end to the second-half tape measure niche 31 and open at an opposite end to the first corner 12a of the housing 12 whereby the second-half tape groove 34 provides communication between the second-half tape measure niche 31 and the first corner 12a. The first-half tape groove 24 is aligned with the second-half tape groove 34.

As best illustrated in FIGS. 1 through 3 and FIG. 7, it can be shown that the first-half member 20 includes a first-half laser source niche 25 adjacent and parallel to the second side 13b of the housing 12. The first-half laser source niche 25 is open to the inner surface 20a of the first-half member 20 and projects from the outer surface 20b of the first-half member 20 so as to form a first-half side wall 25a. The first-half laser source niche 25 has a first-half semi-circular opening 26 therein at one end adjacent the second corner 12b of the housing 12. The first-half semi-circular opening 26 is contiguous with the inner surface 20a of the first-half member 20. The first-half laser source niche 25 also has a slot 27 therein. The slot 27 is provided in the first-half side wall 25a. The second-half member 30 includes a second-half laser source niche 35 adjacent and parallel to the second side 13b of the housing 12. The second-half laser source niche 35 is open to the inner surface 30a of the second-half member 30 and projects from the outer surface 30b of the second-half member 30 so as to form a second-half side wall 35a. The second-half laser source niche 35 has a second-half semi-circular opening 36 therein at one end adjacent the second corner 12b of the housing 12. The second-half semi-circular opening 36 is contiguous with the inner surface 30a of the second-half member 30. The second-half laser source niche 35 and the second-half semi-circular opening 36 are aligned with the first-half laser source niche 25 and the first-half semi-circular opening 26, respectively.

As best illustrated in FIGS. 1 through 7, it can be shown that the first-half member 20 and the second-half member 30 are mateably joined wherein the inner surface 20a of the first-half member 20 abuts the inner surface 30a of the second-half member 30. As such, the first-half tape measure niche 21 and the second-half tape measure niche 31 form a tape measure cavity 14 adapted to receive and encase the tape measure 2. In addition, when the first-half member 20 and the second-half member 30 are mateably joined the first-half niche opening 22 and the first-half hole 23 and the second-half niche opening 32 and the second-half hole 33 form a locking button opening 15. The locking button opening 15 allows access to the locking button 4 of the tape measure 2 when the tape measure 2 is encased within the tape measure cavity 14. Furthermore, when the first-half member 20 and the second-half member 30 are mateably joined the first-half tape groove 24 and the second-half tape groove 34 form a tape slot 16 adapted to receive and encase a length of the extendable and retractable tape 3.

Furthermore, when the first-half member 20 and the second-half member 30 are mateably joined the first-half laser source niche 25 and the second-half laser source niche 35 form a laser source cavity 17 adapted to receive and encase the laser source 5. As such, the first-half semi-circular opening 26 and the second-half semi-circular opening 36 form a light beam opening 18 adjacent the second corner 12b of the housing 12. The laser source 5 is positionable within the laser source cavity 17 such that the visible light beam 6 of the laser source 5 projects through the light beam opening 18. In addition, the slot 27 provided in the first-half laser source niche 25 allows access to the power switch 7 of the laser source 5 when the laser source 5 is encased within the laser source cavity 17.

As best illustrated in FIG. 7, it can be shown that the first-half member 20 has a first-half pair of holes 28 therethrough and the second-half member 30 has a second-half pair of holes 38 therethrough wherein the second-half pair of holes 38 are aligned with the first-half pair of holes 28. A horizontal bubble-leveling vial 41 is fitted within a first of the first-half pair of holes 28 and a first of the second-half pair of holes 38 and a vertical bubble-leveling vial 42 is fitted within a second of the first-half pair of holes 28 and a second of the second-half pair of holes 38 when the first-half member 20 and the second-half member 30 are mateably joined.

As best illustrated in FIG. 1, it can be shown that indicia 50 is provided on the housing 12 for indicating that the user should add a specified increment to the reading of the extendable and retractable tape 3 at the first corner 12a of the housing 12 to compensate for the actual distance to the visible light beam 6 of the laser source 5. In an illustrative embodiment the housing 12 includes the following indicia: "ADD 8 INCHES". The indicia 50 is provided on the housing 12 adjacent the first corner 12a. In addition, the housing 12 has a notch 19 therein adjacent the third corner 12c of the housing 12. The notch 19 is aligned with the visible light beam 6 of the laser source 5 for allowing alignment of the third corner 12c of the housing 12 with the visible light beam 6.

A plurality of fasteners 60, such as self tapping screws, are provided for detachably joining the first-half member 20 and the second-half member 30. Alternatively, the first-half member 20 and the second-half member 30 may be snap-fitted together.

Figure 8:
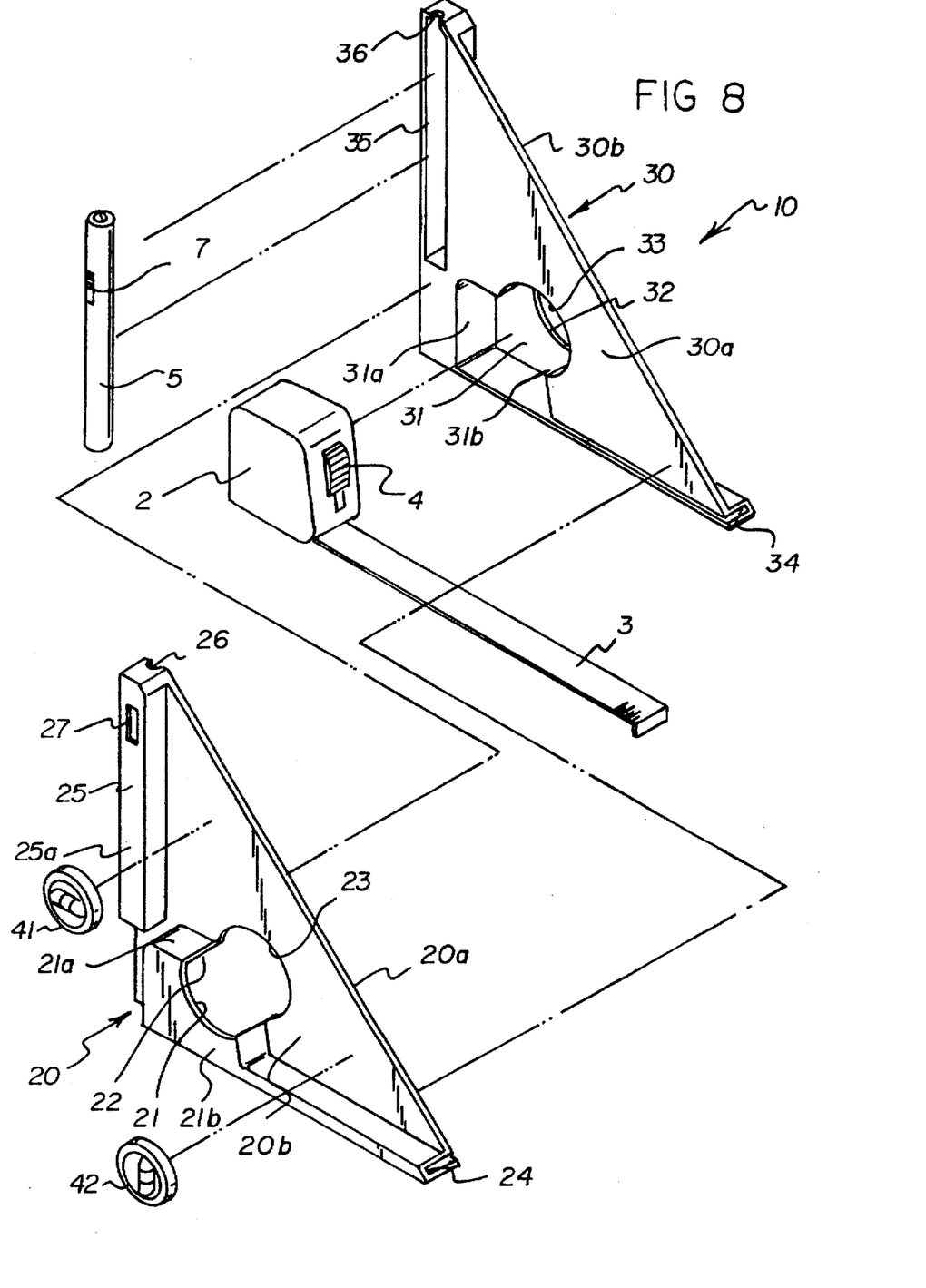
FIG. 8 is an exploded illustration of a second embodiment of the present invention.

As best illustrated in FIG. 8, it can be shown that in a second embodiment of the present invention neither the first-half member 20 nor the second-half member 30 has a pair of holes therethrough. As such, the horizontal bubble-leveling vial 41 and the vertical bubble-leveling vial 42 are mounted on the outer surface 20b of the first-half member 20.

Figure 9:
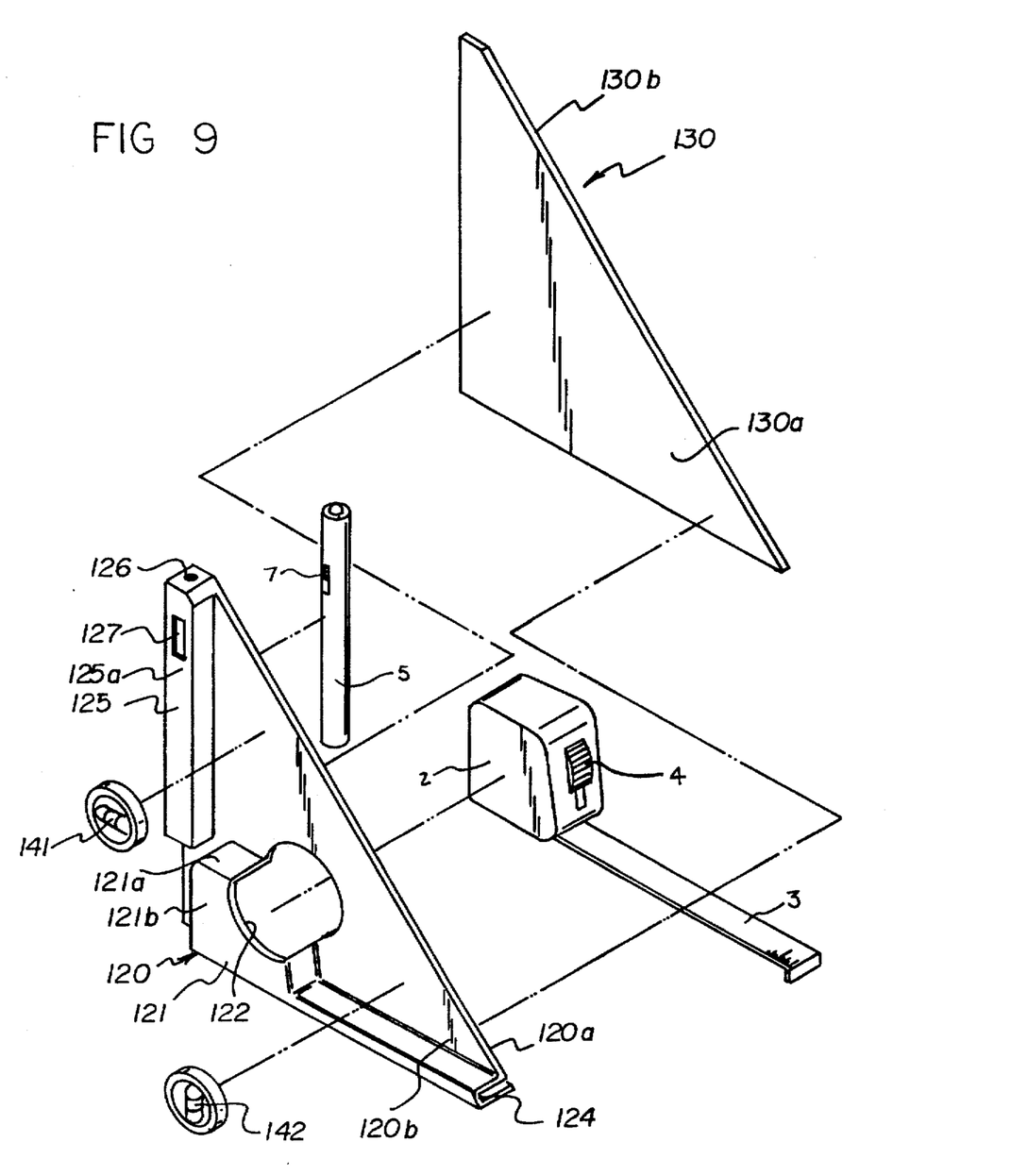
FIG. 9 is an exploded illustration of a third embodiment of the present invention.

As best illustrated in FIG. 9, it can be shown that in a third embodiment of the present invention the housing 12 comprises a first-half member 120 and a second-half member 130. The first-half member 120 and the second-half member 130 each have an inner surface 120a and 130a, respectively, and an outer surface 120b and 130b, respectively. The second-half member 130 is substantially planar.

The first-half member 120 includes a tape measure niche 121 adjacent the first side 13a of the housing 12. The tape measure niche 121 is adapted to receive and encase the tape measure 2. The tape measure niche 121 is open to the inner surface 120a of the first-half member 120 and projects from the outer surface 120b of the first-half member 120 so as to form a perimeter wall 121a and a side wall 121b. The tape measure niche 121 has a niche opening 122 therein. The niche opening 122 is provided in the perimeter wall 121a and the side wall 121b. The niche opening 122 allows access to the locking button 4 of the tape measure 2 when the tape measure 2 is encased within the tape measure niche 121.

The first-half member 120 includes a tape groove 124 adjacent and parallel to the first side 13a of the housing 12. The tape groove 124 is adapted to receive and encase a length of the extendable and retractable tape 3. The tape groove 124 is open to the inner surface 120a of the first-half member 120 and is open at one end to the tape measure niche 121 and open at an opposite end to the first corner 12a of the housing 12 whereby the tape groove 124 provides communication between the tape measure niche 121 and the first corner 12a.

The first-half member 120 includes a laser source niche 125 adjacent and parallel to the second side 13b of the housing 12. The laser source niche 125 is adapted to receive and encase the laser source 5. The laser source niche 125 is open to the inner surface 120a of the first-half member 120 and projects from the outer surface 120b of the first-half member 120 so as to form a side wall 125a. The laser source niche 125 has an opening 126 therein at one end adjacent the second corner 12b of the housing 12. The laser source niche 125 also has a slot 127 therein. The slot 127 is provided in the side wall 125a. The laser source 5 is positionable within the laser source niche 125 such that the visible light beam 6 of the laser source 5 projects through the opening 126 and such that the power switch 7 of the laser source 5 is accessible through the slot 127.

The first-half member 120 and the second-half member 130 are mateably joined wherein the inner surface 120a of the first-half member 120 abuts the inner surface 120b of the second-half member 130. A horizontal bubble-leveling vial 141 and a vertical bubble-leveling vial 142 are mounted on the outer surface 120b of the first-half member 120.

In use, a tape measure 2 including an extendable and retractable tape 3 is encased within the tape measure cavity 14 whereby a length of the extendable and retractable tape 3 is encased within the tape slot 16 and a laser source 5 capable of projecting a visible light beam 6 is encased within the laser source cavity 17 when the first-half member 20 and the second-half member 30 are mateably joined. The extendable and retractable tape 3 is extendable from the first corner 12a of the housing 12 and the visible light beam 6 is projectable from the second corner 12b of the housing 12 perpendicular to the extendable and retractable tape 3. The extendable and retractable tape 3 and the visible light beam 6 are used to ascertain and transfer measurements in one plane or two perpendicular planes. The indicia 50 provided on the housing 12 indicates the amount a user should add to the reading of the extendable and retractable tape 3 at the first corner 12a of the housing 12 to compensate for the actual distance to the visible light beam 6 of the laser source 5. The horizontal bubble-leveling vial 41 and the vertical bubble-leveling vial 42 are used for leveling the housing 12 in horizontal and vertical planes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Combination Tool for use with a tape measure, said tape measure including an extendable and retractable tape and a locking button for locking and releasing said extendable and retractable tape, and for use with a laser source capable of projecting a visible light beam, said laser source including a power switch, said Combination Tool comprising:

a housing, said housing adapted to encase said tape measure and a length of said extendable and retractable tape whereby said extendable and retractable tape is extendable from said housing, said housing adapted to encase said laser source whereby said visible light beam is projectable from said housing, said visible light beam being projectable from said housing substantially perpendicular to said extendable and retractable tape;

wherein said housing is generally triangular-shaped, said housing having a first corner, a second corner, and a third corner, said housing having a first side joining said first corner and said third corner, said housing having a second side joining said second corner and said third corner, said first side and said second side being oriented substantially perpendicular to each other;

wherein said housing includes a compartment formed along the first side adjacent the third corner in a general coplanar relationship with a plane defined by the sides, the housing being adapted for substantially encompassing the tape dispenser in the compartment, the housing further including a cut out formed in a central extent of the housing and in communication with the compartment for exposing a lock of the tape dispenser to facilitate manual access to the lock;

wherein a groove is formed along the first side with said groove being defined by a pair of elongated laterally extending side portions which reside in a plane situated in a general perpendicular relationship with the plane defined by the sides for encasing a length of said extendable and retractable tape of the tape dispenser positioned in the compartment.

2. The Combination Tool of claim 1, further comprising:
a horizontal bubble-leveling vial mounted on said housing for leveling said housing in a horizontal plane, and
a vertical bubble-leveling vial mounted on said housing for leveling said housing in a vertical plane.

3. The Combination Tool of claim 1, further comprising:
indicia provided on said housing for indicating that a user of said combination tool should add a specified increment to a reading of said extendable and retractable tape at said first corner of said housing to compensate for the actual distance to said visible light beam of said laser source.

4. The Combination Tool of claim 3, wherein said indicia is provided on said housing adjacent said first corner.

5. The Combination Tool of claim 1, wherein said housing has a notch therein adjacent said third corner of said housing, said notch aligned with said visible light beam of said laser source.

6. A Combination Tool for use with a tape measure, said tape measure including an extendable and retractable tape and a locking button for locking and releasing said extendable and retractable tape, and for use with a laser source capable of projecting a visible light beam, said laser source including a power switch, said Combination Tool comprising:

a housing, said housing adapted to encase said tape measure and a length of said extendable and retractable tape whereby said extendable and retractable tape is extendable from said housing, said housing adapted to encase said laser source whereby said visible light beam is projectable from said housing, said visible light beam projectable from said housing substantially perpendicular to said extendable and retractable tape;

a horizontal bubble-leveling vial mounted on said housing for leveling said housing in a horizontal plane;

a vertical bubble-leveling vial mounted on said housing for leveling said housing in a vertical plane;

wherein said housing is generally triangular-shaped, said housing having a first corner, a second corner, and a third corner, said housing having a first side joining said first corner and said third corner, said housing having a second side joining said second corner and said third corner, said first side and said second side substantially perpendicular to each other;

wherein said housing includes a first-half member, said first-half member having an inner surface and an outer surface, said first-half member including a tape measure niche adjacent said first side of said housing, said tape measure niche adapted to receive said tape measure, said tape measure niche open to said inner surface of said first-half member, said tape measure niche having a niche opening therein, said niche opening allowing access to said locking button of said tape measure when said tape measure is positioned within said tape measure niche, said first-half member including a tape groove adjacent and parallel to said first side of said housing, said tape groove adapted to receive a length of said extendable and retractable tape, said tape groove open to said inner surface of said first-half member, said tape groove open at one end to said tape measure niche and open at an opposite end to said first corner of said housing, said tape groove providing communication between said tape measure niche and said first corner, said first-half member including a laser source niche adjacent and parallel to said second side of said housing, said laser source niche adapted to receive said laser source, said laser source niche open to said inner surface of said first-half member, said laser source niche having an opening therein at one end adjacent said second corner of said housing, said laser source niche having a slot therein, said slot allowing access to said power switch of said laser source when said laser source is positioned within said laser source niche, said tape measure positionable within said tape measure niche such that said locking button of said tape measure is accessible through said niche opening and such that said extendable and retractable tape is extendable through said tape groove and extendable from said first corner of said housing, said laser source positionable within said laser source niche such that said visible light beam of said laser source projects through said opening and such that said power switch of said laser source is accessible through said slot, and a second-half member, said second-half member having an inner surface and an outer surface, said second-half member being substantially planar, said first-half member and said second-half member mateably joined, said inner surface of said first-half member abutting said inner surface of said second-half member.

7. A Combination Tool for use with a tape measure, said tape measure including an extendable and retractable tape and a locking button for locking and releasing said extendable and retractable tape, and for use with a laser source capable of projecting a visible light beam, said laser source including a power switch, said Combination Tool comprising:

a housing, said housing adapted to encase said tape measure and a length of said extendable and retractable tape whereby said extendable and retractable tape is extendable from said housing, said housing adapted to encase said laser source whereby said visible light beam is projectable from said housing, said visible light beam projectable from said housing substantially perpendicular to said extendable and retractable tape;

wherein said housing is generally triangular-shaped, said housing having a first corner, a second corner, and a third corner, said housing having a first side joining said first corner and said third corner, said housing having a second side joining said second corner and said third corner, said first side and said second side substantially perpendicular to each other;

wherein said housing includes a first-half member, said first-half member having an inner surface and an outer surface, said first-half member including a first-half tape measure niche adjacent said first side of said housing, said first-half tape measure niche open to said inner surface of said first-half member, said first-half tape measure niche having a first-half niche opening therein, said first-half member having a first-half hole therethrough contiguous with said first-half tape measure niche and said first-half niche opening, said first-half member including a first-half tape groove adjacent and parallel to said first side of said housing, said first-half tape groove open to said inner surface of said first-half member, said first-half tape groove open at one end to said first-half tape measure niche and open at an opposite end to said first corner of said housing, said first-half tape groove providing communication between said first-half tape measure niche and said first corner, said first-half member including a first-half laser source niche adjacent and parallel to said second side of said housing, said first-half laser source niche open to said inner surface of said first-half member, said first-half laser source niche having a first-half semi-circular opening therein at one end adjacent said second corner of said housing, said first-half semi-circular opening contiguous with said inner surface of said first-half member, said first-half laser source niche having a slot therein, and a second-half member, said second-half member having an inner surface and an outer surface, said second-half member including a second-half tape measure niche adjacent said first side of said housing, said second-half tape measure niche open to said inner surface of said second-half member, said second-half tape measure niche aligned with said first-half tape measure niche, said second-half tape measure niche having a second-half niche opening therein, said second-half member having a second-half hole therethrough contiguous with said second-half tape measure niche and said second-half niche opening, said second-half hole aligned with said first-half hole, said second-half member including a second-half tape groove adjacent and parallel to said first side of said housing, said second-half tape groove open to said inner surface of said second-half member, said second-half tape groove open at one end to said second-half tape measure niche and open at an opposite end to said first corner of said housing, said second-half tape groove providing communication between said second-half tape measure niche and said first corner, said second-half tape groove aligned with said first-half tape groove, said second-half member including a second-half laser source niche adjacent and parallel to said second side of said housing, said second-half laser source niche open to said inner surface of said second-half member, said second-half laser source niche aligned with said first-half laser source niche, said second-half laser source niche having a second-half semi-circular opening therein at one end adjacent said second corner of said housing, said second-half semi-circular opening contiguous with said inner surface of said second-half member, said second-half semi-circular opening aligned with said first-half semi-circular opening, said first-half member and said second-half member mateably joined, said inner surface of said first-half member abutting said inner surface of said second-half member, whereby said first-half tape measure niche and said second-half tape measure niche form a tape measure cavity adapted to receive and encase said tape measure, whereby said first-half niche opening and said first-half hole and said second-half niche opening and said second-half hole form a locking button opening, whereby said first-half tape groove and said second-half tape groove form a tape slot adapted to receive and encase a length of said extendable and retractable tape, whereby said first-half laser source niche and said second-half laser source niche form a laser source cavity adapted to receive and encase said laser source, whereby said first-half semi-circular opening and said second-half semi-circular opening form a light beam opening, said locking button opening allowing access to said locking button of said tape measure when said tape measure is positioned within said tape measure cavity, said slot provided in said first-half laser source niche allowing access to said power switch of said laser source when said laser source is positioned within said laser source cavity, said tape measure positionable within said tape measure cavity such that said locking button of said tape measure is accessible through said locking button opening and such that said extendable and retractable tape is extendable through said tape slot and extendable from said first corner of said housing, said laser source positionable within said laser source cavity such that said visible light beam of said laser source projects through said light beam opening and such that said power switch of said laser source is accessible through said slot;

wherein said first-half member has a first-half pair of holes therethrough and said second-half member has a second-half pair of holes therethrough, said second-half pair of holes aligned with said first-half pair of holes;

a horizontal bubble-leveling vial fitted within a first of said first-half pair of holes and a first of said second-half pair of holes;

a vertical bubble-leveling vial fitted within a second of said first-half pair of holes and a second of said second-half pair of holes;

indicia provided on said housing for indicating that a user of said combination tool should add a specified increment to a reading of said extendable and retractable tape at said first corner of said housing to compensate for the actual distance to said visible light beam of said laser source, wherein said indicia is provided on said housing adjacent said first corner;

wherein said housing has a notch therein adjacent said third corner of said housing, said notch aligned with said visible light beam of said laser; and a plurality of fasteners for detachably joining said first-half member and said second-half member.

* * * * *